Dec. 16, 1952         S. V. ZAVOICO         2,621,516
POWER-DRIVEN METER
Filed June 12, 1948         2 SHEETS—SHEET 1
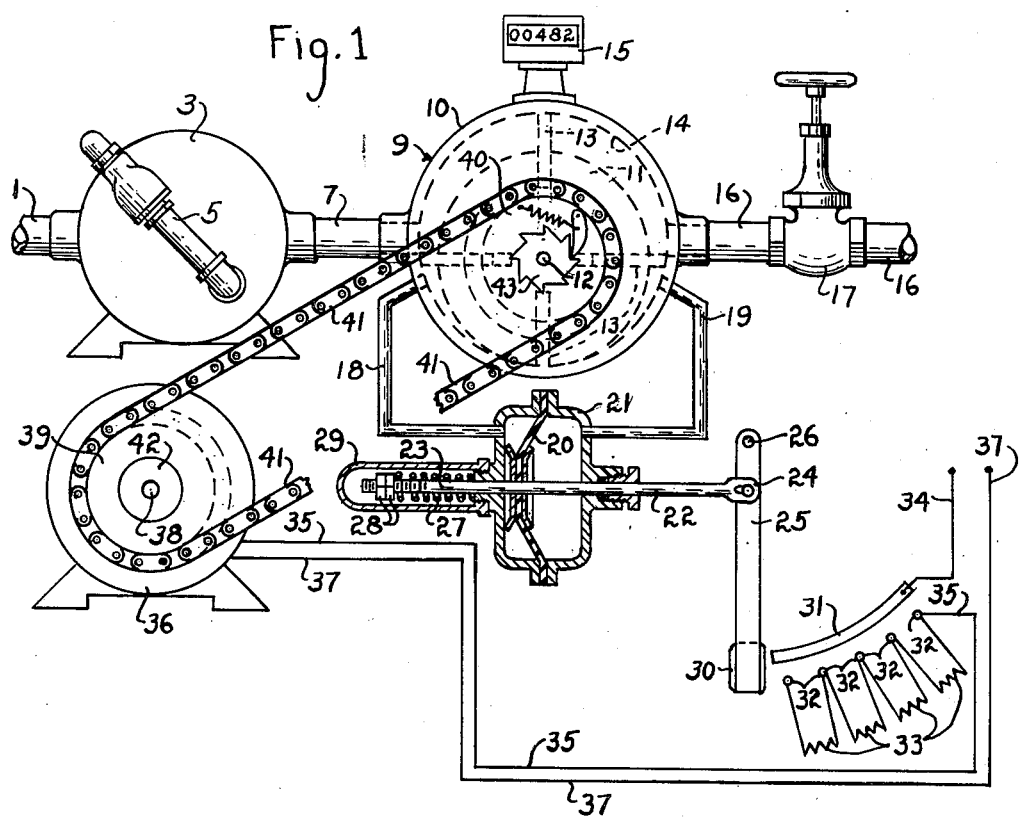
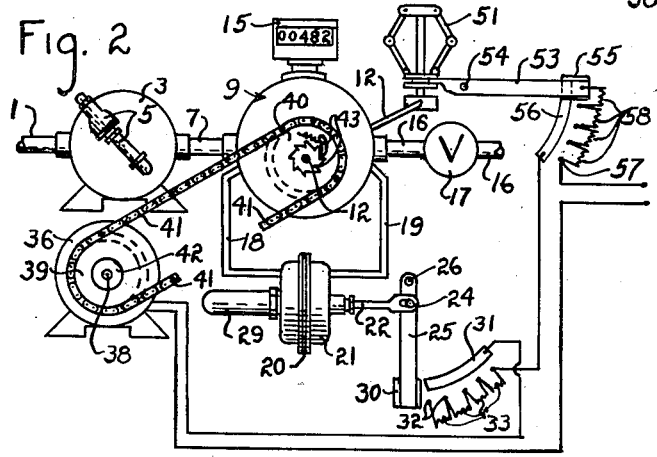
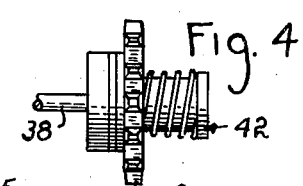
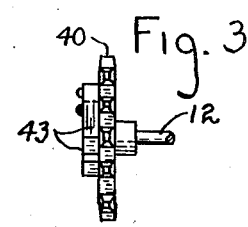
STEPHEN V. ZAVOICO
INVENTOR.
BY Edmund W. E. Kamm
ATTORNEY

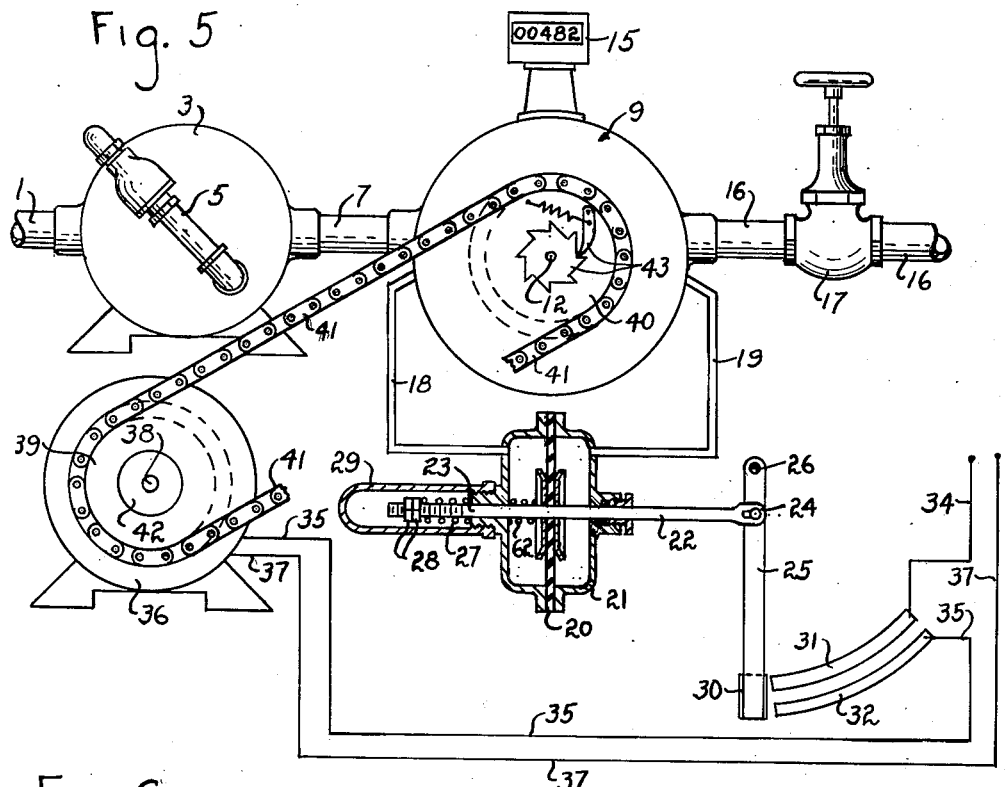

Patented Dec. 16, 1952

2,621,516

UNITED STATES PATENT OFFICE 2,621,516

POWER-DRIVEN METER

Stephen V. Zavoico, Chicago, Ill., assignor to Bowser, Inc., Fort Wayne, Ind., a corporation of Indiana Application June 12, 1948, Serial No. 32,678

9 Claims. (Cl. 73—232)

This invention relates to power driven meters. More specifically it relates to a mechanism for assisting the operation of a meter in response to certain conditions in the meter pipe line.

In the construction of a meter it is accepted practice to do everything possible to avoid slippage of the liquid past the measuring element. Some of the steps taken to prevent this slippage in positive displacement meters, especially of the rotary type are to assign close tolerance to the parts; to make the leverage of the liquid pressure as long as possible; to reduce drag on the rotor and by exposing greater areas to the differential pressure of the liquid. The second and last of these factors tend to make the meter large and bulky. It may be several times the size of the pump which is putting the liquid through the meter. The pump, however, operates at greater speed and with a greater differential pressure, since slippage is important only in that it reduces the efficiency of the device whereas in the meter, the slippage factor is all important.

A part of the pressure drop through the meter is due to hydraulic friction while another part is due to mechanical friction. The former cannot be overcome except by reversing the differential and making a pump out of the meter. This may be acceptable within limits since slippage, within practical tolerances, in either direction would not be objectionable. However, it is improbable that sufficient power can be put into the meter to overcome all of the hydraulic losses, especially at high rates of flow, without inducing intolerable slippage.

The mechanical friction, however should be entirely avoidable by applying an outside source of power to drive the meter.

It is an object of the invention to provide an outside source of power to drive a meter.

Another object is to provide means responsive to conditions in the meter for applying outside power to the meter.

Still another object of the invention is to provide means responsive to the differential pressure on the meter for applying power to the meter.

A further object is to apply power to drive a meter in accordance with the differential pressure on the meter and the speed of the meter.

Yet another object is to provide means interposed in the meter driving means for preventing the application of excessive power to the meter.

Still another object is to prevent the drag of the power source from loading the meter.

These and other objects will become apparent from a study of the drawings which are attached hereto and made a part hereof and in which:

Figure 1 is a view showing a metering system in which the meter is driven in response to differential pressure conditions.

Figure 2 is a view showing a similar system in which the meter drive is responsive to differential pressure and meter speed.

Figure 3 is a detailed view of the meter clutch.

Figure 4 is a detailed view of the overload clutch.

Figure 5 is a modification of the system shown in Figure 1 wherein a single contact is substituted for the multiple contacts and resistances and the lost motion is omitted.

Figure 6 is similar to Figure 5 but with the lost motion and a valve switch added.

Referring now to Figure 1, numeral 1 represents a suction line for liquid which is connected to a pump 3 which has a bypass 5. The outlet of the pump is connected by discharge pipe 7 to a meter 9 which comprises the casing 10, a rotor 11 eccentrically mounted therein on a shaft 12 and having blades 13 which slide in and out of the rotor and contact the bore 14 of the case. A register 15 is connected to be driven by the shaft. The discharge pipe 16 from the meter is connected to a valve 17.

While the meter disclosed is of the rotor and blade type, it is to be understood that this is representative of any meter.

A pipe 18 is connected with the bore 14 at the inlet side and a pipe 19 is connected to the bore at the outlet side. These pipes conduct liquid under inlet and outlet pressures respectively to the opposite sides of a diaphragm 20 housed in a case 21.

A push rod 22 is connected to one side of the diaphragm and a tension rod 23 is connected to the other. Both rods extend through the case and rod 22 carries a lost motion connection 24 which is connected to a lever 25 pivoted at 26 while rod 23 is surrounded by a compression spring 27 held in place by adjusting nuts 28 on the rod. A cap 29 covers the end of the rod and spring.

Lever 25 carries a carbon shoe 30 which is adopted to be moved in sliding contact over a sector 31 and a series of contacts 32. A series of resistances or other impedances 33, such as inductances or capacitances in the case of an alternating current system, are connected between contacts 32. A line 34 leads from a power main to a sector 31 while a line 35 connects the final contact 32 with a motor 36, the other side of which is connected to the main by line 37.

The shaft 38 of the motor is connected in any suitable manner to drive the shaft 12 of the meter. In this case sprockets 39 and 40 are connected by chain 41. An overload clutch 42, which may comprise a friction facing on sprocket 39 which is spring pressed against a collar on shaft 38 as shown in Figure 4, is preferably interposed between shaft 38 and sprocket 39 while a one way clutch 43, which may comprise a ratchet on shaft 2 driven by a spring pressed pawl carried by sprocket 40 as shown in Figure 3, is interposed between sprocket 40 and shaft 12.

Operation

When the valve 17 is closed and pump 3 is operating, the differential pressure across the meter will be zero since the pressure in the system will be equalized. The diaphragm 20 will be in its normal or home position and in such case holds shoe 30 away from contacts 31 and 32, hence the motor 36 is deenergized.

When valve 17 is opened the pressure of liquid on the discharge side of the meter will drop and the meter should start to rotate. This passes liquid from the inlet to the outlet side and tends to decrease the differential in pressure.

Should the meter not start, the differential will be high and since this differential is applied to the diaphragm 20, the latter will be displaced to the right to position shoe 30 on contacts 31 and 32 and current will be applied to the motor 36. The latter will drive the meter.

Should the meter start and run at a differential below that at which the motor is cut in, the clutch 43 will prevent torque from being applied to the motor so that the meter will turn freely.

If the valve 17 is opened suddenly the high differential may cause the motor to start to boost the meter but the motor will again stop as soon as the differential falls below that imposed on the diaphragm by the spring setting.

Should the motor for any reason tend to drive the meter beyond reasonable limits, the torque applied to the sprocket 39 will exceed the capacity of clutch 42 and the clutch will slip.

It should be noted that with the differential pressure characteristics of the meter being known at the various speeds, the resistances 33 can be calculated for each pressure drop so that the speed of the motor will be somewhat in excess of that of the meter so that it will assume some of the load of the meter and will be slowed thereby toward the meter speed.

As the motor assumes some of the load of the meter, the differential pressure will drop and this tends to restore the diaphragm toward normal position and would move the contact shoe 30 back to the next lower contact 32 and would cause a hunting action. The lost motion connection 24 prevents this since the differential pressure can vary between the existing position and that which existed before the last effective positioning movement of shoe 30 occurred without affecting the impedance setting.

Modified form

In the modified form of Figure 2 the mechanism is the same as that described above with the exception that the meter shaft 12 drives a governor 51 which may be of any desired type and which operates a lever 53, pivoted at 54. The lever carries a shoe 55 which spans a sector 56 and a series of contacts 57 having resistances or other impedances 58, such as inductances or capacitances in the case of an alternating current system, connected between them and connected in series with the impedances 33 described above.

In this case, the impedances 58 are cut out in proportion to the meter speed so that such speed is compensated directly and the impedances 33 therefore need compensate only for the differential pressure across the meter as explained above.

Additional modified form

The invention also embraces the simplest form of auxiliary drive which comprises the apparatus shown in Figure 5 and which is the same as that shown in Figure 1 with the exception that instead of the contacts 32 and resistances 33, a simple sector similar to 31 is substituted for contacts 32. This structure then constitutes merely a switch which is closed when a predetermined differential pressure is attained. The motor 36 will come up to speed and apply a constant torque to the meter, the magnitude of which is determined by the setting of the torque clutch. In this case the normal position of the diaphragm may be in the center which position is held by a spring 62.

If desired, the lost motion connection 24 can be made with a long slot in rod 22 so that the switch will not be opened again until a limited reversal of the differential pressure is attained and spring 62 is compressed, thus making the meter a pump to a limited extent.

In this case a switch 60 is provided which is operated by a yoke lever 63 and rod 65 so as to open when the valve closes and close in response to weight 66 when the valve opens so that the motor will not be operating when the system is shut down.

This structure is shown in Figure 6 which is the same as Figure 5 with the exceptions noted.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a metering system comprising a flow line and means for applying fluid under pressure to said line, the combination which comprises a meter in said line, a normally inactive power means and control means responsive to the differential pressure across the meter for activating said power means to drive said meter and additional means responsive to the speed of the meter for regulating the speed of the power means.

2. In a metering system comprising a flow line and means for applying fluid under pressure to said line, the combination which comprises a meter in said line, said meter serving to create a differential pressure in the line, a power means and a constantly engaged slip clutch, adapted to transmit torque only up to a predetermined maximum, connected between the power means and the meter, and differential pressure responsive means communicating with said line at opposite sides of the meter for controlling the operation of said power means.

3. In a metering system comprising a flow line and means for applying fluid under pressure to said line, the combination which comprises a meter in said line, said meter serving to create a differential pressure in the line, a power means and a constantly engaged slip clutch, adapted to transmit torque only up to a predetermined maximum, connected between the power means and the meter, and differential pressure responsive means communicating with said line at opposite sides of the meter for starting and stopping said power means.

4. In a metering system comprising a flow line and means for applying fluid under pressure to said line, the combination which comprises a meter in said line, a power means, means connecting said power means to drive said meter, means responsive to the pressure differential across said meter, a variable impedance means connected for operation by said pressure responsive means, a device responsive to the speed of the meter, a second variable impedance means connected for operation thereby, a source of power, and means connecting both said impedance means with said source and said power means, for controlling the speed of said power means in accordance with their combined effects.

5. In a metering system comprising a flow line and means for applying fluid under pressure to said line, the combination which comprises a meter in said line, a power means, means connecting said power means to drive said meter, means responsive to the pressure differential across said meter, a variable impedance means connected for operation by said pressure responsive means, a device responsive to the speed of the meter, a second variable impedance means connected for operation thereby, a source of power, means connecting both said impedance means with said source and said power means, for controlling the speed of said power means in accordance with their combined effects, said first impedance means being constructed and arranged to decrease or increase as said differential pressure increases and decreases and said second impedance means being constructed and arranged to decrease or increase as the speed increases or decreases.

6. In a metering system comprising a flow line and means for applying fluid under pressure to said line, the combination which comprises a meter in said line, a power means and power transmission means, comprising means adapted to transmit torque only up to a predetermined maximum, connected between the power means and the meter and means responsive to the increase and decrease of pressure differential across the meter for starting and stopping the power means.

7. In a metering system comprising a flow line and means for applying fluid under pressure to said line, the combination which comprises a meter in said line, a power means and power transmission means, comprising means adapted to transmit torque only up to a predetermined maximum, connected between the power means and the meter, said transmission means comprising also a one way drive mechanism and means responsive to the increase and decrease of pressure differential across the meter for starting and stopping the power means.

8. In a metering system comprising a flow line and means for applying fluid under pressure to said line, the combination which comprises a meter in said line, a power means and power transmission means, comprising means adapted to transmit torque only up to a predetermined maximum, connected between the power means and the meter, and means responsive to the increase and decrease of differential pressure across the meter for starting and stopping the power means, said responsive means including a differential pressure responsive element connected to the meter and having at least three positions corresponding to a normal, a zero and a reversed differential pressure, a switch, means including a lost motion device connecting said element and switch, said lost motion device serving to close said switch under a normal and to open the switch under a reversed differential pressure.

9. A metering system as defined by claim 6, including a valve in the flow line and means responsive to the opening and closing of the valve for controlling the starting and stopping of the motor.

STEPHEN V. ZAVOICO.

REFERENCES CITED

The following references are of record in the file of this patent:

UNITED STATES PATENTS

| Number | Name | Date |
|---|---|---|
| 765,030 | Moore | July 12, 1904 |
| 1,697,223 | Brumbaugh | Jan. 1, 1929 |
| 1,952,882 | Morgan | Mar. 27, 1934 |
| 2,080,183 | Pigott | May 11, 1937 |
| 2,088,271 | McCandless | July 27, 1937 |